United States Patent
Jin et al.

(10) Patent No.: US 8,522,401 B2
(45) Date of Patent: Sep. 3, 2013

(54) HINGE APPARATUS FOR PORTABLE COMMUNICATION DEVICE

(75) Inventors: Jae-Chul Jin, Suwon-si (KR); Se-Bum Choi, Seoul (KR)

(73) Assignees: Samsung Electronics Co., Ltd (KR); Prexco Co., Ltd (KR)

( * ) Notice: Subject to any disclaimer, the term of this patent is extended or adjusted under 35 U.S.C. 154(b) by 335 days.

(21) Appl. No.: 12/465,347

(22) Filed: May 13, 2009

(65) Prior Publication Data

US 2009/0282650 A1    Nov. 19, 2009

(30) Foreign Application Priority Data

May 14, 2008  (KR) .................. 10-2008-0044517

(51) Int. Cl.
*E05D 7/00* (2006.01)
(52) U.S. Cl.
USPC .............................................. 16/354; 16/366
(58) Field of Classification Search
USPC ......... 16/354, 367; 361/679.05; 379/433.13; 455/575.1, 575.3
See application file for complete search history.

(56) References Cited

U.S. PATENT DOCUMENTS

| | | | | |
|---|---|---|---|---|
| 7,140,074 B2 * | 11/2006 | Han et al. | | 16/366 |
| 7,168,135 B2 * | 1/2007 | Jung et al. | | 16/367 |
| 7,286,861 B2 * | 10/2007 | Woo | | 455/575.3 |
| 7,549,193 B2 * | 6/2009 | Lee et al. | | 16/342 |
| 2005/0064919 A1 | 3/2005 | An et al. | | |
| 2005/0122671 A1 * | 6/2005 | Homer | | 361/681 |
| 2005/0155182 A1 * | 7/2005 | Han et al. | | 16/336 |
| 2006/0111146 A1 | 5/2006 | Kim | | |
| 2008/0307608 A1 * | 12/2008 | Goto | | 16/366 |

FOREIGN PATENT DOCUMENTS

| | | | |
|---|---|---|---|
| EP | 1 707 829 | | 10/2006 |
| JP | 2008141712 A | * | 6/2008 |
| JP | 2008275139 A | * | 11/2008 |

\* cited by examiner

*Primary Examiner* — Victor Batson
*Assistant Examiner* — Matthew Sullivan
(74) *Attorney, Agent, or Firm* — Farrell Law Firm, P.C.

(57) ABSTRACT

A hinge apparatus for a portable communication device having a body, a folder, and a rotary hinge module mounted between the body and the folder. The hinge apparatus includes at least one gear hinge part for opening and closing the body and the folder on a first hinge axis. The hinge apparatus also includes a hinge connection part for coupling the at least one gear hinge part to the rotary hinge module. The rotary hinge module allows for rotation of the folder about a second hinge axis perpendicular to the first hinge axis.

7 Claims, 7 Drawing Sheets

HINGE APPARATUS FOR PORTABLE COMMUNICATION DEVICE

PRIORITY

This application claims priority under 35 U.S.C. §119(a) to a Korean Patent Application filed in the Korean Intellectual Property Office on May 14, 2008 and assigned Serial No. 10-2008-44517, the disclosure of which is incorporated herein by reference.

BACKGROUND OF THE INVENTION

1. Field of the Invention

The present invention relates generally to a portable communication device, and more particularly, to a hinge apparatus for a portable communication device, which has a hinge connection part for connecting gear hinge parts to a rotary hinge module as a single united body.

2. Description of the Related Art

In general, the 'portable communication device' refers to an electronic device by which a user can perform wireless communication with another party. Various types of service contents, such as mobile banking, TV viewing, on-line games, Video-On-Demand (VOD), etc., as well as voice call service and Short Message Service (SMS), are provided to the user over the portable communication device.

Popularized conventional portable communication devices can be classified into several types according to their appearance. For example, the portable communication devices can be classified into bar-type, flip-type, folder-type, and sliding-type communication devices.

The folder-type terminal has a body, a folder, and a hinge apparatus for pivotably coupling the folder to the body, so that the folder can be rotatably folded and unfolded.

Recently, a portable communication device with a rotary hinge apparatus has been developed. A pair of housings is foldably coupled using a hinge apparatus that provides a pair of hinge axes, so that when the housings are unfolded, the front and rear faces of any one housing can be reversed. Various examples of a portable communication device with a rotary hinge apparatus are described in Korean Patent Publication No. 2003-17321, filed on Mar. 3, 2003, which is commonly owned by the assignee of the present application.

The portable communication device having a rotary hinge apparatus provides hinge members to both a hinge module providing a first hinge axis and a hinge module providing a second hinge axis.

However, the conventional rotary hinge apparatus has a limitation on miniaturization and slimness due to the hinge modules arranged along their hinge axes, and securing space in the terminal for installation of a large-sized display is difficult.

In addition, the hinge members provided to their hinge modules should be assembled individually rather than as a single united body, causing an increase in the assembly time, and an increase in the number of parts, which may raise the production cost.

Further, the conventional rotary hinge apparatus is protrusively mounted between the body and the folder, marring the design of the terminal. To address these and other disadvantages, there is a need to secure a space where a large display can be mounted, and there is also need for a hinge apparatus by which the body and the folder can be disposed in a straight line.

SUMMARY OF THE INVENTION

The present invention has been made to address at least the above problems and/or disadvantages and to provide at least the advantages described below. Accordingly, an aspect of the present invention provides a hinge apparatus for a portable communication device, which provides a hinge connection part for coupling gear hinge parts to a rotary hinge module as a single united body, thereby contributing to a reduction in an assembly time of the product, and reducing the cost with the decrease in the number of parts.

Another aspect of the present invention provides a hinge apparatus for a portable communication device, which provides a hinge connection part for coupling gear hinge parts to a rotary hinge module as a single united body to thereby prevent the protrusion of the hinge module, ensuring desirable design of the product and contributing to slimness and miniaturization of the product.

A further aspect of the present invention provides a hinge apparatus for a portable communication device, which provides a hinge connection part for coupling gear hinge parts to a rotary hinge module as a single united body to thereby secure an installation space for installing a large display.

According to one aspect of the present invention, a hinge apparatus is provided for a portable communication device having a body, a folder, and a rotary hinge module mounted between the body and the folder. The hinge apparatus includes at least one gear hinge part for opening and closing the body and the folder on a first hinge axis. The hinge apparatus also includes a hinge connection part for coupling the at least one gear hinge part to the rotary hinge module that allows the folder to rotate about the second hinge axis. The second hinge axis is perpendicular to the first hinge axis.

Preferably, the gear hinge part includes a first gear shaft having a first gear part and a hinge cam, coupled to the hinge connection part, which is screwed to a side of the body. The gear hinge part may include a second gear shaft having a second gear part rotatably engaged with the first gear part, and a hinge cam, coupled to the hinge connection part, which is screwed to a side of the folder. The gear hinge part may also include a gear hinge shaft that is through-connected to the first and second gear shafts, and faces hinge cams of the first and second gear shafts. The gear hinge part may additionally include an elastic member that is through-connected to the first and second gear shafts, and applies pressure to an end of the gear hinge shaft. The gear hinge part may further include a gear hinge housing that embeds therein the first and second gear shafts, the gear hinge shaft and the elastic member.

Preferably, one end of the first gear shaft is coupled to the hinge connection part, which is screwed to a side of the body, and another end passes through the gear hinge housing, with an E-ring protrusively coupled thereto.

Preferably, one end of the second gear shaft is coupled to the hinge connection part, which screwed to a side of the folder, and another end passes through the gear hinge housing, with an E-ring protrusively coupled thereto.

Preferably, the hinge connection part includes at least one first connection part that is screwed to the body, and coupled to one end of the first gear shaft as a single united body. The hinge connection part may also include at least one second connection part that is screwed to the folder, and coupled to one end of the second gear shaft as a single united body. The hinge connection part may additionally include a third connection part that is coupled to the second connection part, and coupled to the second hinge axis of the rotary hinge module as a single united body.

Preferably, at least one screw coupling part coupled to the folder is formed in the first, second and third connection parts.

Preferably, a protection cap for protecting the gear hinge parts is provided surrounding the gear hinge parts.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention are described in detail with reference to the accompanying drawings. In the drawings, the same or similar elements are denoted by the same reference numerals even though they are depicted in different drawings. Detailed descriptions of constructions or processes known in the art may be omitted to avoid obscuring the subject matter of the present invention.

As illustrated in FIGS. 1-7, a hinge apparatus 10 of a portable communication device includes a body 20, a folder 30 having first and second cases 31 and 32, a rotary hinge module 40, at least one gear hinge part 50, and a hinge connection part 60. The rotary hinge module 40 provides a first hinge axis A1 for opening/closing of the body 20 and the folder 30, and a second hinge axis A2 being perpendicular to the first hinge axis A1. The rotary hinge module 40 is mounted between the body 20 and the folder 30 such that the folder 30 can rotate on the second hinge axis A2.

Figure 1:
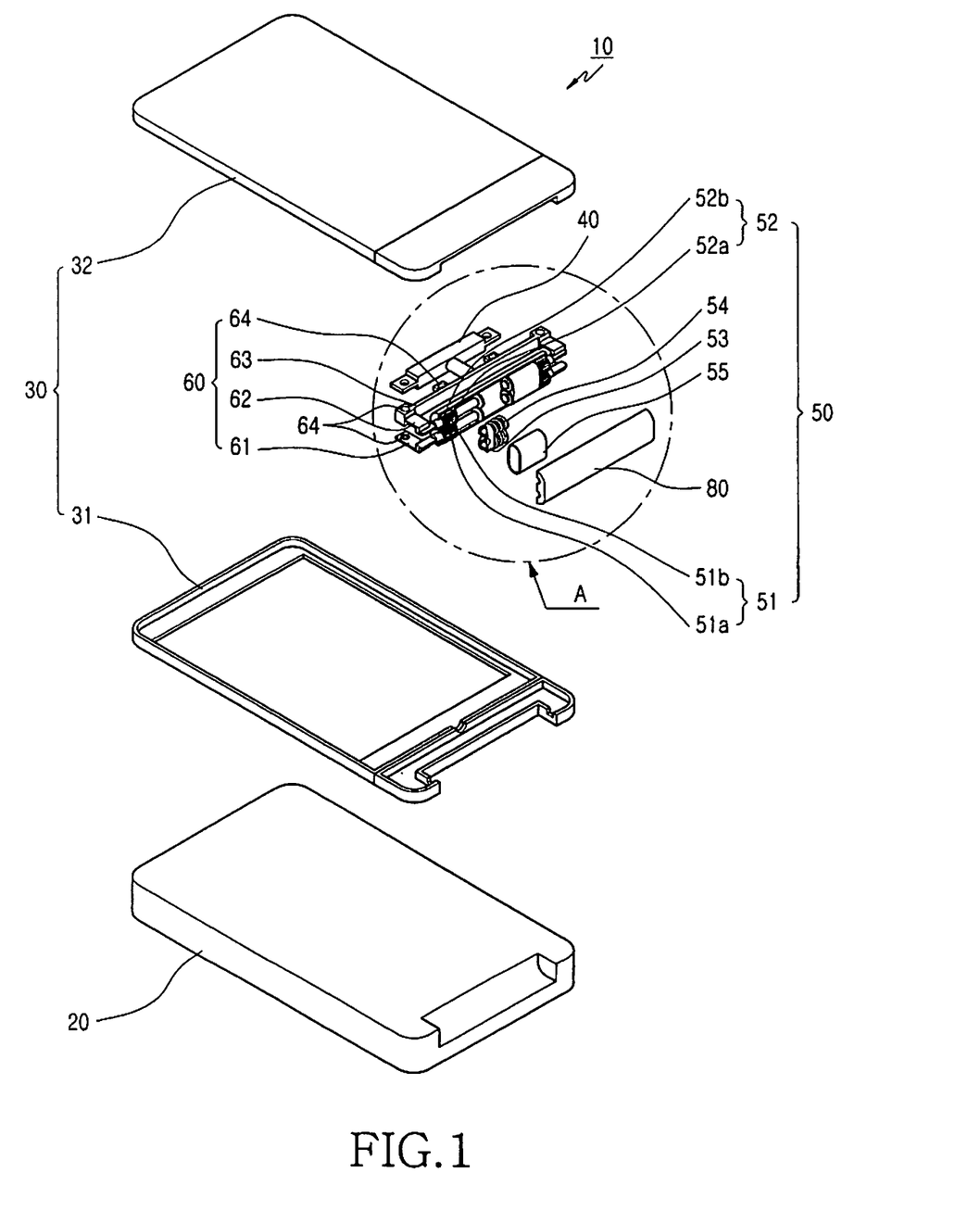
FIG. 1 is a disassembled perspective view illustrating a structure of a hinge apparatus for a portable communication device according to an embodiment of the present invention.
Figure 2:
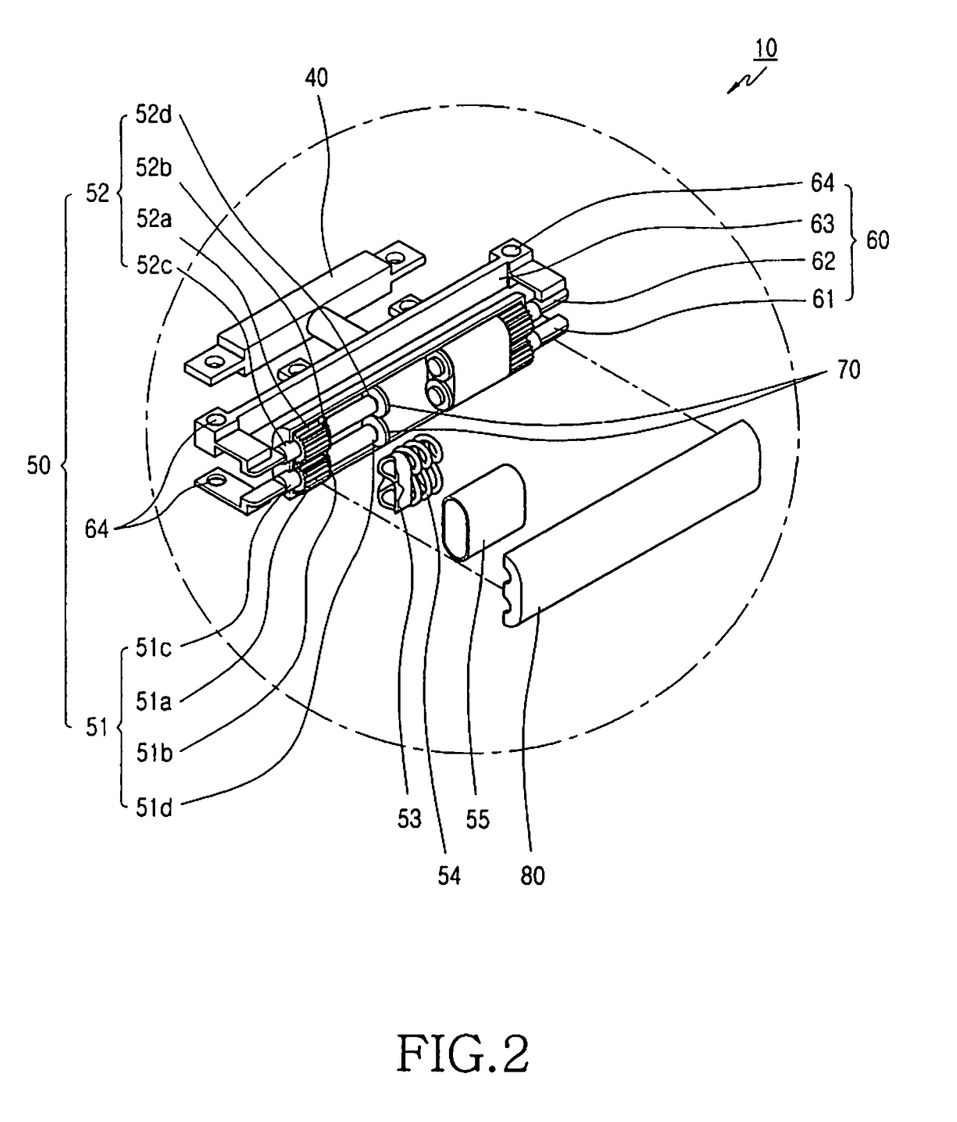
FIG. 2 is an enlarged disassembled perspective view of the part A shown in FIG. 1.

As illustrated in FIGS. 1 and 2, the at least one gear hinge part 50 enables the first hinge axis A1, and is mounted between the body 20 and the folder 30 so that the folder 30 can rotate on the first hinge axis A1 with respect to the body 20. The hinge connection part 60 is prepared between the body 20 and the folder 30 so that the rotary hinge module 40 can be coupled to the gear hinge part 50 as a single united body.

As illustrated in FIGS. 1-4, the gear hinge part 50 includes first and second gear shafts 51 and 52, a gear hinge shaft 53, an elastic member 54, and a gear hinge housing 55. The first gear shaft 51 provides a first gear part 51a and a hinge cam 51b, and is coupled to the hinge connection part 60. Hinge connection part 60 is screwed to a side of the body 20 by screws 90, as a single united body so that the first gear part 51a can engage with a second gear part 52a of the second gear shaft 52. The second gear shaft 52 provides the second gear part 52a and a hinge cam 52b, and is coupled to the hinge connection part 60. Hinge connection part 60 is screwed to a side of the folder 30 by screws 90, as a single united body so that the second gear part 52a can rotatably engage with the first gear part 51a. The gear hinge shaft 53 is through-connected to the first and second gear shafts 51 and 52 so that it can face the hinge cams 51b and 52b of the first and second gear shafts 51 and 52. The elastic member 54 is through-connected to the first and second gear shafts 51 and 52 so as to apply pressure to another end of the gear hinge shaft 53. The gear hinge housing 55 is adapted to embed therein the first and second gear shafts 51 and 52, the gear hinge shaft 53, and the elastic member 54.

Figure 3:
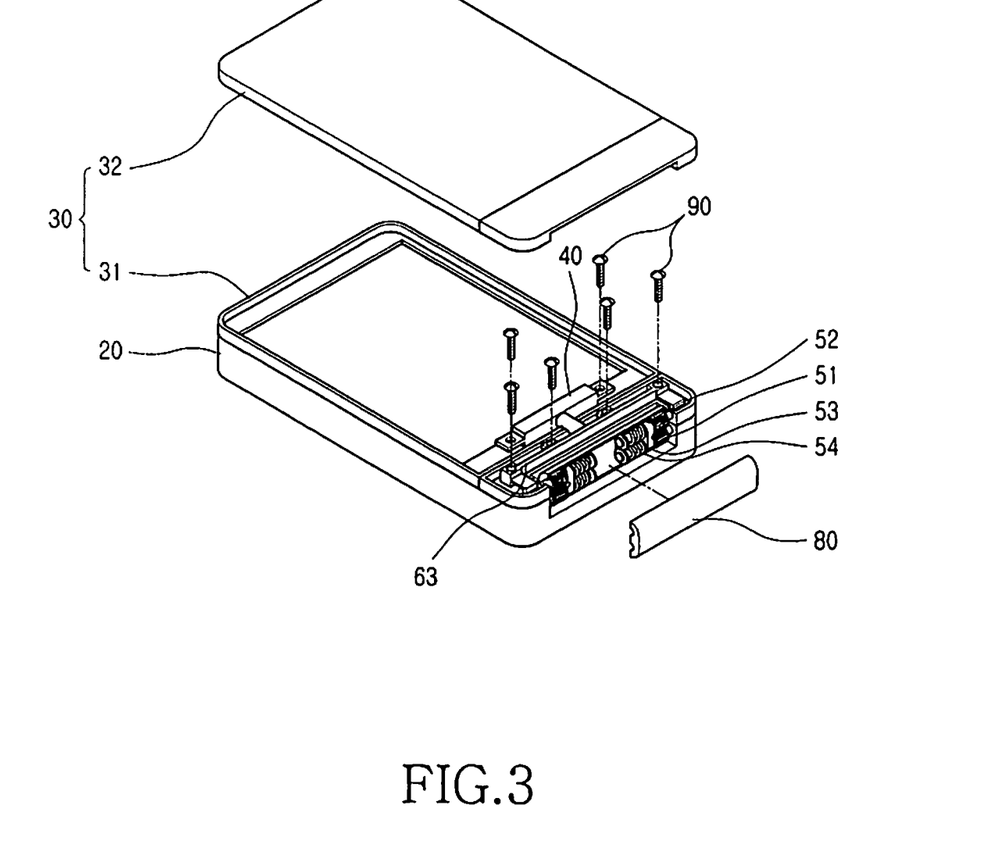
FIG. 3 is a disassembled perspective view illustrating an uncoupled state of a hinge apparatus for a portable communication device according to an embodiment of the present invention.
Figure 4:
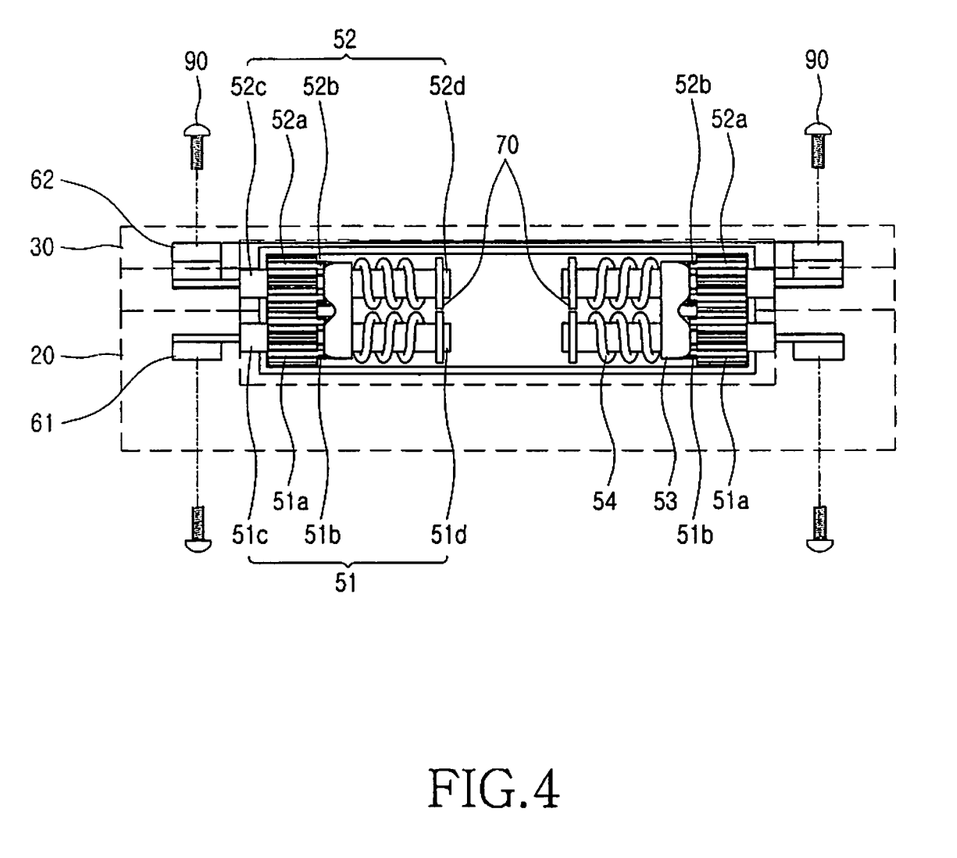
FIG. 4 is a front view illustrating a coupled state of a hinge apparatus for a portable communication device according to an embodiment of the present invention.

As illustrated in FIGS. 2-4, one end 51c of the first gear shaft 51 is coupled to the hinge connection part 60 as a single united body, which is screwed to a side of the body 20 by the screws 90. Another end 51d of the first gear shaft 51 passes through a hole formed in the gear hinge housing 55, with an E-ring 70 protrusively coupled thereto. One end 52c of the second gear shaft 52 is coupled to the hinge connection part 60 as a single united body, which is screwed to a side of the folder 30. Another end 52d of the second gear shaft 52 passes through a hole formed in the gear hinge housing 55, with an E-ring 70 protrusively coupled thereto.

Figure 5:
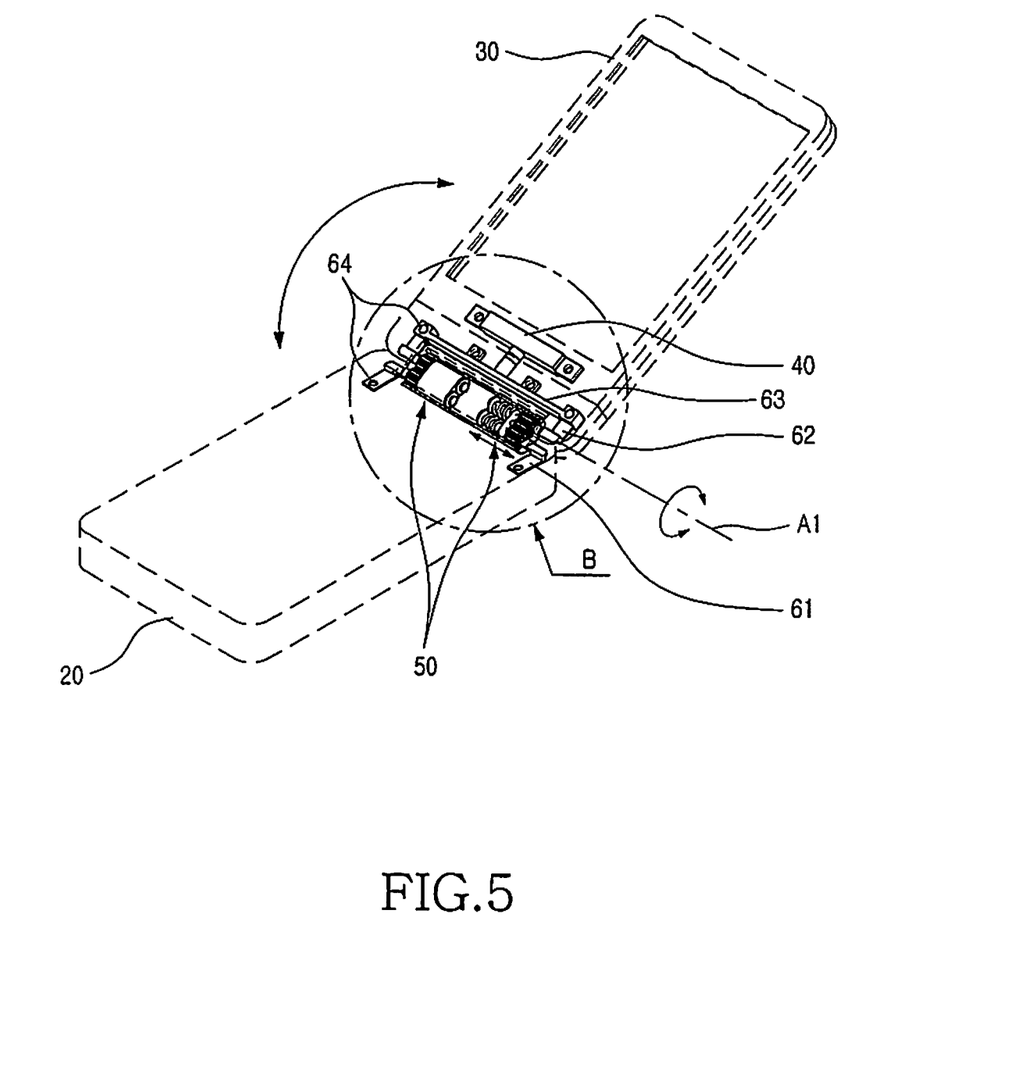
FIG. 5 is a perspective view illustrating a structure of a hinge apparatus for a portable communication device when the folder rotates on the first hinge axis, according to an embodiment of the present invention.
Figure 6:
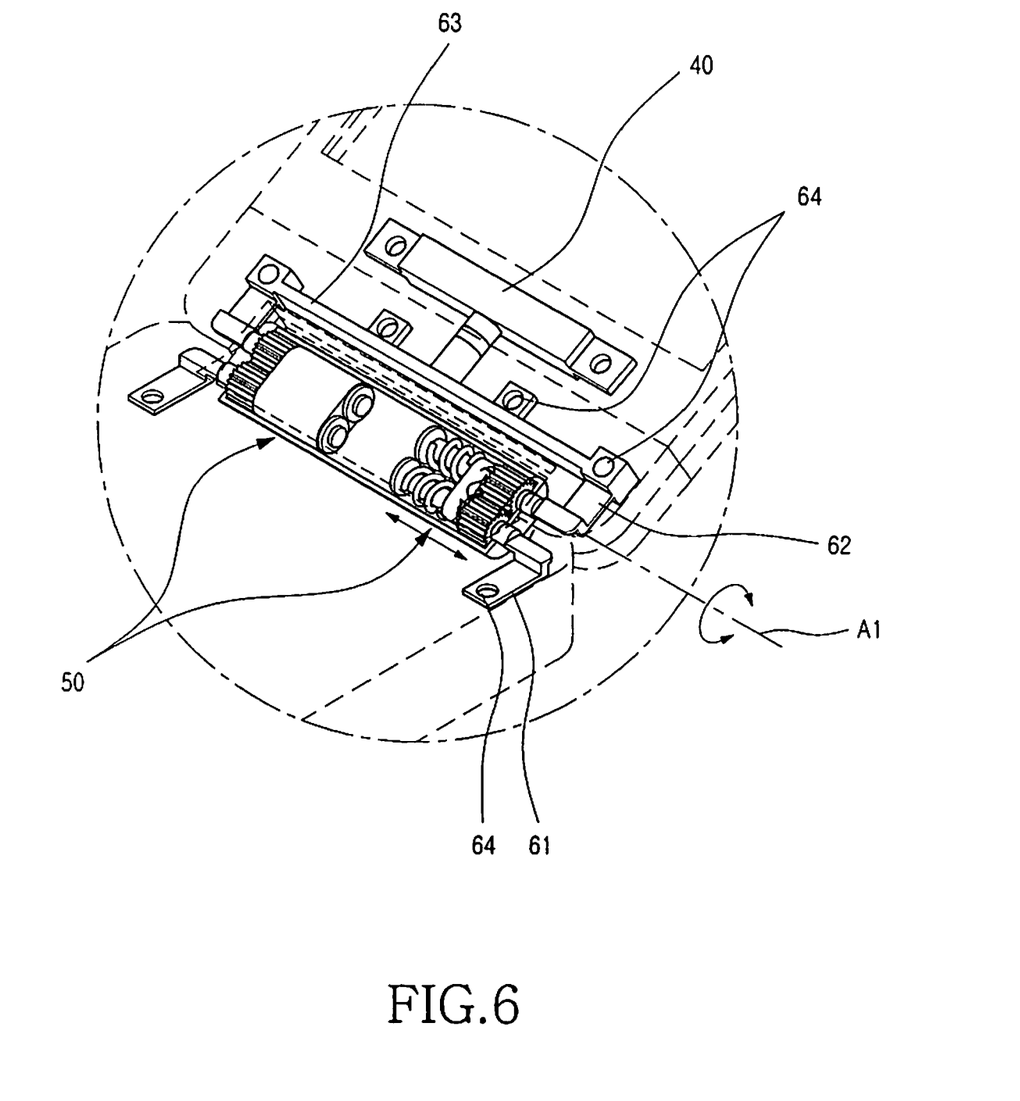
FIG. 6 is an enlarged perspective view of the part B shown in FIG. 5.

As illustrated in FIGS. 2, 5 and 6, the hinge connection part 60 includes first, second and third connection parts 61, 62 and 63. The first connection part 61 is screwed to the body 20 by screws 90 so that it can be coupled to one end of the first gear shaft 51 as a single united body. The second connection part 62 is screwed to the folder 30 by screws 90 so that it can be coupled to one end of the second gear shaft 52 as a single united body. The third connection part 63 is coupled to the second connection part 62 as a single united body so that it can be connected to the second hinge axis A2 of the rotary hinge module 40 as a single united body.

As illustrated in FIGS. 4-7, at least one screw coupling part 64 is formed in the first, second and third connection parts 61, 62 and 63, so that they are screwed to the body 20 and the folder 30 by screws 90.

As illustrated in FIG. 1, a protection cap 80 is provided surrounding the gear hinge parts 50 so as to protect the gear hinge parts 50.

With reference to FIGS. 1-7, a detailed description will now be made of an operation of the hinge apparatus for a portable communication device according to a preferred embodiment of the present invention.

As illustrated in FIGS. 1-4, the hinge apparatus 10 for a portable communication device includes the body 20, the folder 30, the rotary hinge module 40, the at least one gear hinge part 50, and the hinge connection part 60.

The gear hinge part 50 includes the first and second gear shafts 51 and 52, the gear hinge shaft 53, the elastic member 54, and the gear hinge housing 55. The hinge connection part 60 includes the first, second and third connection parts 61, 62 and 63.

As illustrated in FIGS. 1-7, one end 51c of the first gear shaft 51 is coupled to the first connection part 61 as a single united body, and one end 52c of the second gear shaft 52 is coupled to the second connection part 62 as a single united body. The second connection part 62 and the third connection part 63 are coupled to each other as a single united body, and the third connection part 63 is coupled to the second hinge axis A2 of the rotary hinge module 40 as a single united body.

As illustrated in FIGS. 2 and 4, the gear hinge shaft 53 and the elastic member 54 are coupled to the first and second gear shafts 51 and 52, with the gear hinge shaft 53 facing the hinge cams 51b and 52b formed on the first and second gear shafts 51 and 52. Here, the first and second gear parts 51a and 52a provided on the first and second gear shafts 51 and 52 rotatably engage with each other. In addition, threads formed on the hinge cams 51b and 52b face grooves formed on the gear hinge shaft 53.

In this state, as shown in FIGS. 1 and 2, the elastic member 54 is coupled to the rear face of the gear hinge shaft 53, and then the gear hinge housing 55 is combined.

The other ends of the first and second gear shafts 51 and 52 pass through the hole formed in the gear hinge housing 55, with an E-ring 70 protrusively coupled thereto. Thereafter, the protection cap 80 is combined surrounding the gear hinge parts 50.

In this state, as illustrated in FIGS. 4-7, the first connection part 61 is screwed to the body 20 by screws 90, and the second connection part 62 is screwed to the folder 30 by screws 90. At the same time, the gear hinge part 50 and the rotary hinge module 40 are mounted together between the body 20 and the folder 30.

As illustrated in FIG. 5, the folder 30 can rotate on the first hinge axis A1 with respect to the body 20. As the second gear shaft 52 rotates, the first gear shaft 51 also rotates together in an engaged manner.

As the hinge cams 51b and 52b of the first and second gear shafts 51 and 52 also rotate, the gear hinge shaft 53 linearly moves along the first hinge axis A1.

After the folder 30 completes it rotation, the gear hinge shaft 53 linearly moves again to face the hinge cams 51b and 52b. Here, the gear hinge shaft 53 can linearly move by means of elastic force of the elastic member 54.

Figure 7:
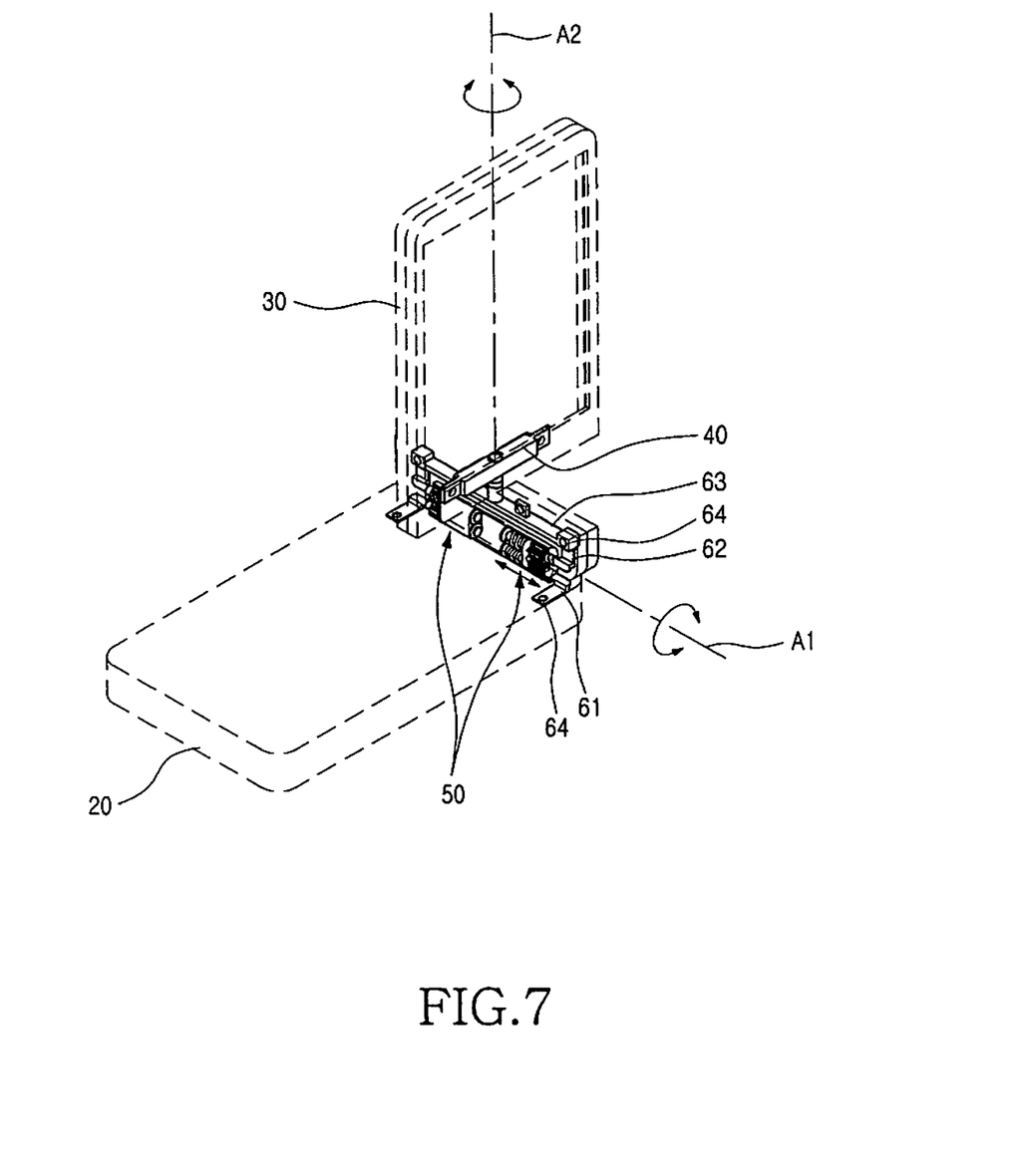
FIG. 7 is a perspective view illustrating a structure of a hinge apparatus for a portable communication device when the folder rotates on the second hinge axis, according to an embodiment of the present invention.

Further, as illustrated in FIG. 7, the folder 30 can rotate on the second hinge axis A2.

As is apparent from the foregoing description, the present invention couples the first and second gear shafts of the gear hinge part to the rotary hinge module as a single united body by means of the hinge connection part, thereby ensuring convenient assembly of the hinge apparatus and thus contributing to a reduction in the assembly time.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A hinge apparatus for a portable communication device having a body, a folder, and a rotary hinge module mounted between the body and the folder, the hinge apparatus comprising:
    a first gear hinge part on a first hinge axis linearly opposed to a second gear hinge part on the first hinge axis, the first gear hinge part and the second gear hinge part for opening and closing the folder by rotation, with respect to the body, on the first hinge axis; and
    a hinge connection part for coupling the first gear hinge part and the second gear hinge part to the rotary hinge module,
    wherein the rotary hinge module allows for rotation of the folder about a second hinge axis perpendicular to the first hinge axis, and
    wherein the first and second gear hinge parts comprise:
    a first gear shaft, having a first gear part and a hinge cam, coupled to the hinge connection part, which is screwed to a side of the body;
    a second gear shaft, having a second gear part rotatably engaged with the first gear part and a hinge cam, coupled to the hinge connection part, which is screwed to a side of the folder;
    a gear hinge shaft that is through-connected to the first and second gear shafts, and faces hinge cams of the first and second gear shafts;
    an elastic member that is through-connected to the first and second gear shafts, and applies pressure to an end of the gear hinge shaft; and
    a gear hinge housing that embeds therein the first and second gear shafts, the gear hinge shaft and the elastic member.

2. The hinge apparatus of claim 1, wherein one end of the first gear shaft is coupled to the hinge connection part, which is screwed to a side of the body, and another end passes through the gear hinge housing, with an E-ring protrusively coupled thereto.

3. The hinge apparatus of claim 1, wherein one end of the second gear shaft is coupled to the hinge connection part, which screwed to a side of the folder, and another end passes through the gear hinge housing, with an E-ring protrusively coupled thereto.

4. The hinge apparatus of claim 1, wherein the hinge connection part comprises:
    at least one first connection part that is screwed to the body, and coupled to one end of the first gear shaft;
    at least one second connection part that is screwed to the folder, and coupled to one end of the second gear shaft; and
    a third connection part that is coupled to the second connection part, and coupled to the rotary hinge module.

5. The hinge apparatus of claim 4, wherein at least one screw coupling part coupled to the folder is formed in the first, second and third connection parts.

6. The hinge apparatus of claim 1, wherein a protection cap for protecting the first and second gear hinge parts surrounds the first and second gear hinge parts.

7. A hinge apparatus for a portable communication device having a body, a folder, and a hinge module which is mounted between the body and the folder, the hinge apparatus comprising:
    a first gear hinge part on a first hinge axis linearly opposed to a second gear hinge part on the first hinge axis, the first gear hinge part and the second gear hinge part for opening and closing the folder by rotation, with respect to the body, on the first hinge axis; and
    a hinge connection part which couples the first and second gear hinge parts to the hinge module,
    wherein the hinge module allows for rotation of the folder about a second hinge axis perpendicular to the first hinge axis, and
    wherein the first and second gear hinge parts comprise:
    a first gear shaft, having a first gear part and a hinge cam, coupled to the hinge connection part, which is screwed to a side of the body;
    a second gear shaft, having a second gear part rotatably engaged with the first gear part and a hinge cam, coupled to the hinge connection part, which is screwed to a side of the folder;
    a gear hinge shaft that is through-connected to the first and second gear shafts, and faces hinge cams of the first and second gear shafts;
    an elastic member that is through-connected to the first and second gear shafts, and applies pressure to an end of the gear hinge shaft; and a gear hinge housing that embeds therein the first and second gear shafts, the gear hinge shaft and the elastic member.

* * * * *